United States Patent [19]

Yamada

[11] 4,447,147

[45] May 8, 1984

[54] OPTICAL SCANNING DEVICE

[75] Inventor: Yu Yamada, Kokubunji, Japan

[73] Assignee: Canon Kabushiki Kaisha, Tokyo, Japan

[21] Appl. No.: 352,713

[22] Filed: Feb. 26, 1982

[30] Foreign Application Priority Data

Mar. 9, 1981 [JP] Japan .................................. 56-33561
May 29, 1981 [JP] Japan .................................. 56-82681

[51] Int. Cl.³ ...................... G03B 27/48; G03B 27/50; G03B 27/70
[52] U.S. Cl. ........................................ 355/51; 355/57
[58] Field of Search ...................... 350/297; 355/8, 11, 355/51, 57

[56] References Cited

U.S. PATENT DOCUMENTS 3,884,573 5/1975 Franklin ................................ 355/51
4,008,958 2/1977 Kingsland ............................ 355/51
4,103,991 8/1978 Kramer ............................ 355/51 X Primary Examiner—Richard A. Wintercorn
Attorney, Agent, or Firm—Fitzpatrick, Cella, Harper & Scinto

[57] ABSTRACT

An optical system for scanning a surface to be scanned in a slit-like form includes an image forming optical system for forming the image of the surface to be scanned, and a scanner for scanning the surface to be scanned disposed between the image forming optical system and a position whereat the image of the surface to be scanned is formed. The scanner varies the direction of the optical axis of the system three or greater odd number times to thereby make the direction of the optical axis incident on the scanner and the direction of the optical axis emergent from the scanner into the same direction.

6 Claims, 15 Drawing Figures

FIG. 3
FIG. 4
FIG. 5
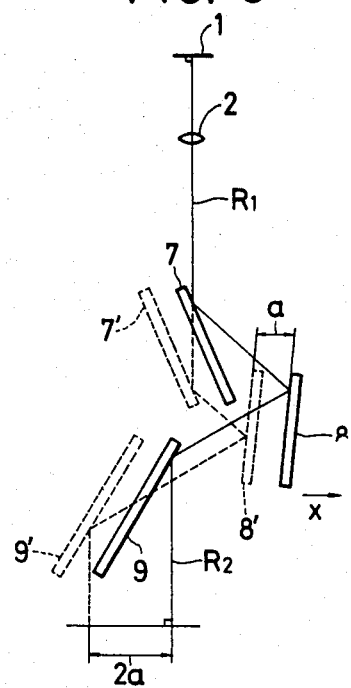
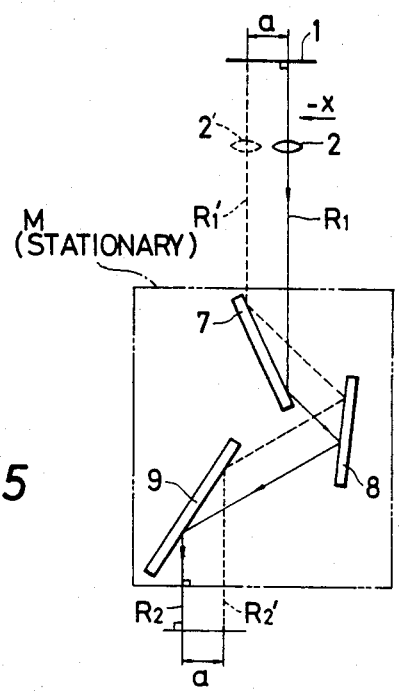
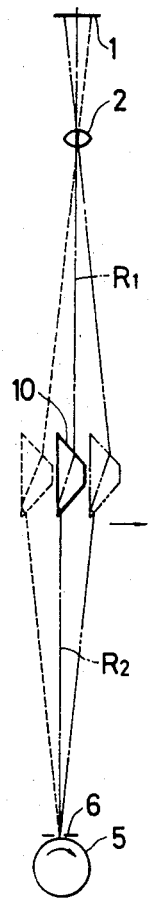

OPTICAL SCANNING DEVICE

BACKGROUND OF THE INVENTION

1. Field of the Invention

This invention relates to a slit exposure type optical scanning device having a scanning system on the image side with an original and a fixed lens.

2. Description of the Prior Art

Among slit exposure scanning type copying machines and microfilm printers, some have a scanning system in the object side area and some have a scanning system in the image side area. The object side area is an area in the optical path from the original to the lens, and the image side area is an area from the lens to the photosensitive medium. Generally, if the scanning system is in the object side area, it is necessary to vary the speed of movement of the scanning system in accordance with the copying magnification, but if the scanning system is in the image side area, the speed of movement of the scanning system can be made constant independently of the copying magnification.

In a conventional example disclosed in British Pat. No. 1,223,449 which has a scanning system in the image side area, the number of mirrors forming the scanning system is one and the vicinity in which the principal ray is coincident with the optical axis cannot be used and therefore, only one half of the angle of view of the lens system can be used and accordingly, the use of such a scanning system has encountered the problem that a lens having a wide angle of view is required.

In the scanning system disclosed in Japanese Laid-open Patent Application No. 102041/1978, a lens whose maximum angle of view for the optical axis is about one half of that of the lens shown in the aforementioned British Pat. No. 1,223,449 suffices and scanning is carried out only by rectilinear movement and thus, the mechanism is simple. FIG. 1 of the accompanying drawings shows such scanning system. In FIG. 1, the slit area of a fixed original 1 is projected onto a drum 5 rotated in the direction indicated by the arrow, by a lens 2 via mirrors 3 and 4. In the optical path, short of the drum 5, there is provided a light beam controlling member 6 for controlling the slit area. In such a system, if the mirrors 3 and 4 are moved together in the direction of the moving tangential line of the drum 5 at ½ of the speed of the drum 5, the slit area of the original 1 is successively scanned and the whole original is copied with the original 1 and the lens 2 remaining fixed. However, the number of mirrors of this scanning system is two and the system is of such a construction that the emergent principal ray turns back the incident principal ray, and the drum 5 and the lens 2 are spatially close together and this leads to a problem that there is no room for the devices provided around the drum. Further, if an attempt is made to widen the spacing between the lens and the drum to provide such room the problem will occur that when the mirror 4 closer to the drum moves away from the lens in the optical path, the angle of view of the effective light beam becomes wider and thus the system becomes bulky. Also, if the scanning system is moved up and down or, vibrated in the direction of the incident optical axis, the problem that the length of the optical path is varied will arise.

SUMMARY OF THE INVENTION

It is an object of the present invention to provide a compact optical scanning device.

It is a further object of the present invention to provide an optical scanning device in which the angle of view of the imaging optical system need not be selected to a great value.

It is still a further object of the present invention to provide an optical scanning device in which the length of the optical path is not varied by vibration.

In the optical scanning device according to the present invention, a scanning means disposed more adjacent to the image side than means for forming the image of a surface to be scanned has a means for varying the direction of the optical path three or greater odd number times and the direction of the optical axis of the system incident on the scanning means is made identical to the direction of the optical axis of the system emergent from the scanning means, thereby achieving the above objects. The direction of the optical axis is defined as the direction of the optical axis taken in the direction in which a light beam travels, namely, the direction of the optical axis going from the object side to the image side. Accordingly, even if the optical axes are parallel to each other, if the direction going from the object side to the image side is opposite, the directions of the optical axes are not identical. In the device according to the present invention, the position of the optical axis incident on the scanning system is always in a fixed state, but the position of the optical axis emergent from the scanning system is moved parallel to the movement of the scanning system. However, the incident optical axis and the emergent optical axis are always parallel to each other and the directions in which they go from the object side toward the image side are kept in the same direction.

In the optical scanning device according to the present invention, the scanning system may comprise either a combination of three or more mirrors or a prism having one or more reflecting surfaces. Where the scanning system comprises mirrors, a film having special reflection characteristics for wavelength may be provided on any surface of the mirrors to thereby attain the matching between the light-emitting characteristics of a light source portion for illuminating the surface to be scanned and the photosensitive characteristics of a photosensitive projection surface. Where the scanning system is a prism, a film having a special transmission or reflection characteristics for wavelength may be provided, for such purpose, on the transmitting surface of the prism or on the inner reflecting surface of the prism which does not utilize total reflection.

In the optical scanning device according to the present invention, the optical axis incident on the scanning system and the optical axis emergent from the scanning system are parallel to each other and therefore, during magnification change, it is easy to move one of the mirrors forming the scanning system while keeping the parallel relation between the optical axes and thus, a magnification change can be accomplished easily.

The invention will become more fully apparent from the following detailed description thereof taken in conjunction with the accompanying drawings.

BRIEF DESCRIPTION OF THE DRAWINGS

FIG. 3 illustrates the state of the optical axis in the device shown in FIG. 2.

FIG. 4 shows a relation optically equivalent to the optical system in FIG. 3.

FIG. 5 shows another embodiment of the optical scanning device according to the present invention.

DESCRIPTION OF THE PREFERRED EMBODIMENTS

Figure 1:
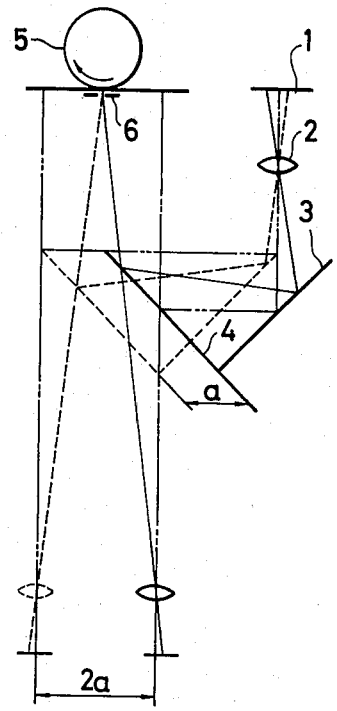
FIG. 1 shows the optical scanning device according to the prior art.
Figure 2:
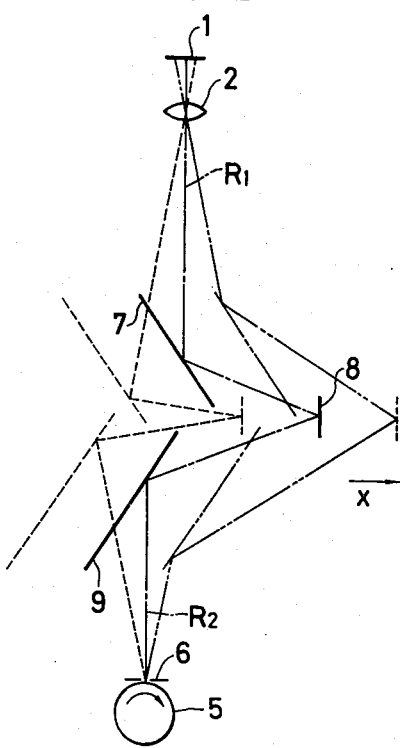
FIG. 2 shows an embodiment of the optical scanning device according to the present invention.

FIG. 2 shows an embodiment of the present invention. In the figure, dotted line, dot-and-dash line and dots-and-dash line indicate the principal rays of a light beam imaged on a drum 5 at respective scan positions. The dot-and-dash line also indicates the optical axis. The slit area light of an original 1 is projected onto the drum 5 by a lens 2 via mirrors 7, 8, 9 and through a light beam controlling member 6. An incident optical axis R1 and an emergent optical axis R2 are set parallel to each other. In such a system, the mirrors 7, 8 and 9 together constitute a scanning system and are moved together in the direction of the moving tangential line of the drum 5 at ½ of the peripheral speed of the drum 5, whereby the whole of an original 1 is copied with the original 1 and the lens 2 remaining stationary.

FIG. 3 is a schematic view regarding the optical axis, and FIG. 4 is a view for describing FIG. 3 and showing an optical system equivalent to FIG. 3. In FIG. 3, the scanning system M comprising the mirrors 7, 8 and 9 is moved in x direction relative to the fixed original 1 and lens 2, but in FIG. 4, the scanning system M comprising the mirrors 7, 8 and 9 is relatively fixed and the original 1 and lens 2 are moved in −x direction.

In FIG. 4, the positional relation between the incident optical axis R1 before moved and the incident optical axis R1' after movement is reverse to the positional relation between the emergent optical axis R2 before movement and the emergent optical axis R2' after movement. That is, as indicated by broken line in FIG. 4, what appeared on the right-hand side of the optical axis R1 relative to the direction of travel of the light beam on the incident side of the scanning system M lies on the left-hand side of the optical axis R2 relative to the direction of travel of the light beam on the emergent side of the scanning system M.

This reversal occurs because the number of mirrors forming the scanning system M is an odd number. In the present embodiment, the scanning system M comprises three mirrors 7, 8 and 9, and if the number of mirrors forming the scanning system is three or greater odd number, a relation similar to that in FIG. 4 will be brought about with R1 and R2 being parallel to each other whatever mirror arrangement the scanning system may assume.

In FIG. 4, the optical axis is only bent by the mirrors 7, 8 and 9 and the length of the optical axis remains unchanged even when scanning is effected, and thus, the imaging relation is kept. When the original 1 and lens 2 are displaced by a distance a in −x direction, they are displaced by the same distance a in +x direction on the image plane.

If a displacement by a generally in +x direction is imparted to the system of FIG. 4 after movement, the system of FIG. 3 is brought about. That is, if the scanning system M is moved at ½ of the speed of movement of the image plane in the direction of movement of the image plane, the whole original will be copied with the original 1 and the lens 2 remaining stationary.

Referring to FIG. 5 which shows another embodiment of the device according to the present invention, broken line, dot-and-dash line and dots-and-dash line indicate the principal rays of a light beam imaged on a drum 5 at respective scanning positions. The dot-and-dash line also indicates the optical axis. In FIG. 5, the slit area of an original 1 is projected onto the drum 5 by a lens 2 through a prism 10 and a light beam controlling member 6. An incident optical axis R1 and an emergent optical axis R2 are set parallel to each other, and the prism 10 constitutes a scanning system and is moved in the direction of the moving tangential line of the drum 5, namely, in a direction perpendicular to the optical axis, at ½ of the peripheral speed of the drum 5. Thereby, the whole original is copied with the original 1 and the lens 2 remaining stationary. In this embodiment, the prism 10 is a dove prism having its reflecting surface set parallel to the optical axis.

Figure 6:
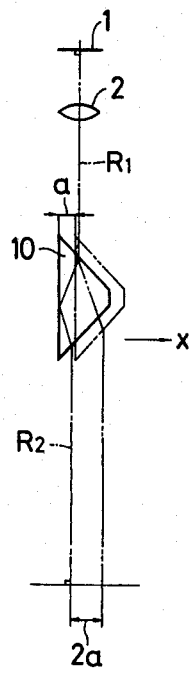
FIG. 6 illustrates the state of the optical axis in the device shown in FIG. 5.
Figure 7:
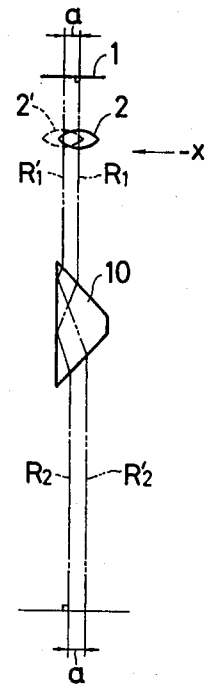
FIG. 7 shows a relation optically equivalent to the optical system shown in FIG. 6.

FIG. 6 is a schematic view regarding the optical axis of the device shown in FIG. 5, and FIG. 7 shows a system having a relation equivalent to FIG. 6 to make FIG. 6 easily understood. In FIG. 6, the scanning system comprising the prism 10 is moved in x direction relative to the fixed original 1 and lens 2. In FIG. 7, the scanning system comprising the prism 10 is relatively fixed and the original 1 and lens 2 are moved in −x direction. In FIG. 7, the relation between the emergent optical axis R2 before movement and the emergent optical axis R2' after movement is reverse in relation to the incident optical axis R1 before movement and the incident optical axis R1' after movement.

That is, as indicated by dots-and-dash line, what appeared on the right-hand side of the optical axis R1 toward the direction of travel of the light beam on the incidence side of the scanning system comprising the prism 10 lies on the left-hand side of the optical axis R2 toward the direction of travel of the light beam on the emergence side of the scanning system. This is because the scanning system comprising the prism 10 is constituted by an odd-number of reflecting surfaces.

It will be appreciated from this that when the original 1 and the lens 2 are displaced by a distance a in −x direction, they are displaced by the same distance a in +x direction on the image plane.

If a displacement by a generally in +x direction is imparted to the system of FIG. 7 after movement the system of FIG. 6 is brought about. That is, the scanning system comprising the prism 10 is moved in the direction of movement of the image plane at ½ of the speed of movement of the image plane, whereby the whole original is copied with the original 1 and the lens 2 remaining stationary.

Figure 8:
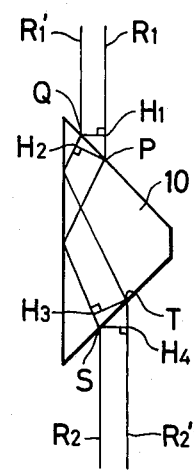
FIG. 8 shows a state in which the length of the optical axis does not vary during scanning.

It is shown in FIG. 8 that the length of the optical axis remains unchanged in FIG. 7 even if scanning is effected.

In FIG. 8, $\overline{PH_1} = n \cdot \overline{QH_2}$ and $\overline{TH_4} = n \cdot \overline{SH_3}$ are readily calculated by using the law of refraction. In the foregoing equations, n represents the refractive index of the prism 10. The length of the optical path totally reflected from a point P by the inclined side of the prism 10 and leading to a point $H_3$ is equal to the length of the optical path totally reflected from a point $H_2$ by the inclined side of the prism 10 and leading to a point T.

It will be appreciated from this that the length of the optical axis remains unchanged even if scanning is effected.

Also, in the present invention, even if the prism 10 is moved up and down in the direction of the optical axis, it does not affect the imaging performance.

Figure 9:
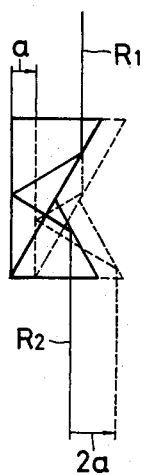
FIGS. 9, 10 and 11 show prisms as the scanning systems applicable to the device of the present invention.
Figure 10:
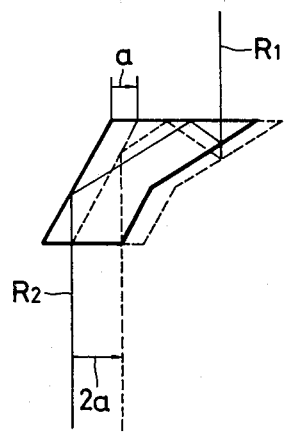
Figure 11:
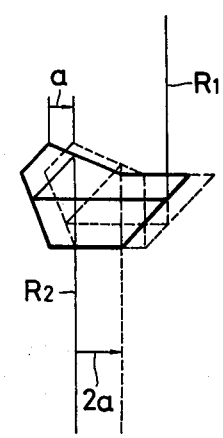

FIGS. 9, 10 and 11 show further embodiments of the scanning system applied to the light scanning device of the present invention. Each prism has odd number of reflecting surfaces. The incident optical axis R1 and the emergent optical system R2 are set parallel to each other and, because the number of reflecting surfaces in the image side scanning system is an odd number, the direction of displacement can be reversed on the incidence side and the emergence side, as shown in FIG. 7.

Where a prism is used as the scanning system as described above, if the reflecting surface of the prism cannot utilize total reflection, this surface may be made into a mirror by an evaporated film or the like.

It is further possible to endow this evaporated film with a spectral wavelength reflection characteristics to match the wavelength distribution of the light source with the spectral wavelength sensitivity characteristics of the photosensitive medium. It is also possible to provide a film for compensating for the above-described photosensitivity on the transmitting surface of the prism.

Figure 12:
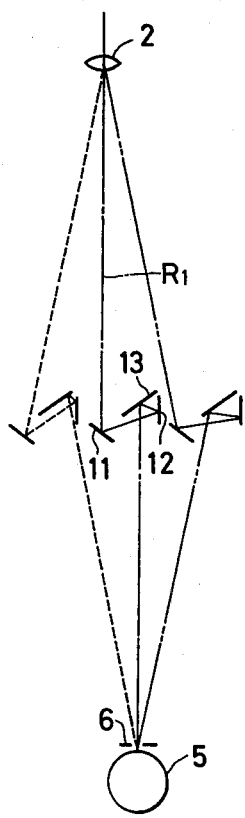
FIG. 12 shows still another embodiment of the optical scanning device according to the present invention.
Figure 13:
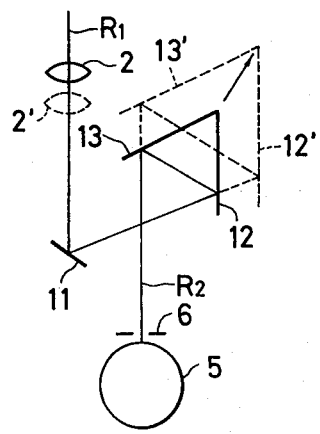
FIG. 13 shows a state in which the optical element of the device shown in FIG. 12 is moved during magnification change.

Description will now be made of the optical scanning device according to the present invention having a magnification changing function added thereto. Referring to FIG. 12 which shows the device of the present invention convenient for the addition of a magnification changing function, the scanning system comprises mirrors 11, 12 and 13 and is disposed in the optical path intermediate the lens 2 and the drum 5. In this system, the entrance optical path to the mirror 12 and the exit optical path from the mirror 13 intersect each other and make it easy to correct any variation in the length of the optical path resulting from a change of the magnification where the lens 2 is a fixed focus lens. FIG. 13 shows the state of movement of the optical element during a magnification change of the device shown in FIG. 12. As shown in FIG. 13, during magnification change, the position of the fixed focus lens is moved along the optical axis while, at the same time, the mirrors 12 and 13 are together in the direction of arrow, whereby the length of the optical path can be easily corrected without varying the entrance optical path and the exit optical path.

Figure 14:
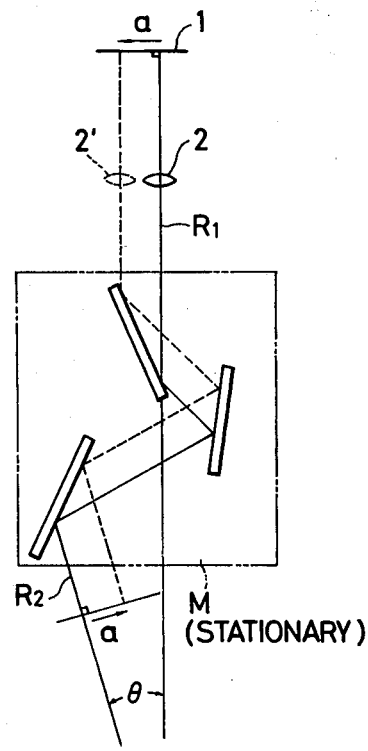
FIGS. 14 and 15 show a state in which the image is not focused on the surface of a drum unless the optical scanning device according to the present invention is used.

The incident optical axis R1 and the emergent optical axis R2 have been described as being parallel to each other, and this is because, if they are not parallel, the direction of movement of the image plane will become deviate from the image plane to thereby cause defocus. This will be described by reference to FIG. 14.

Figure 15:
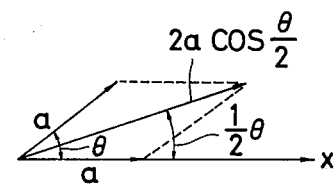

When an equivalent system similar to that of FIG. 4 in which the incidence optical axis R1 and the emergent optical axis R2 form an angle of $\theta$ therebetween is considered, namely, when the scanning system M is considered to be a stationary system, the original 1 and the lens 2 are displaced by a in $-x$ direction and displaced on the image plane by a in a direction forming an angle of $\theta$ with x direction. When a displacement by a generally in x direction is imparted to this system, as shown in FIG. 15, the direction of movement of the image forms an angle of $(\frac{1}{2})\theta$ with the initial image plane direction x and therefore, the imaging relation is not kept on the drum surface. That is, defocus occurs.

In the present invention, the scanning system M has been described as being moved integrally, but the individual mirrors forming the scanning system M may be moved separately from one another and as a result, the scanning system includes what is equivalent to the system already described.

Also, in the present invention, the above-described objects are achieved by the optical axis leading from the lens system to the drum surface changing its direction three or greater odd number times, but the optical axis should desirably change its direction three times when the loss of quantity of light and optical adjustments are taken into consideration. Further, for magnification change, not only the above-described optical path length correcting method but also other various known methods are conceivable. As regards the exposure of the original, use may be made of either light passed through the original or reflected light from the original.

In the optical scanning device of the present invention, even if the scanning system M is moved up and down, namely, in the direction of the incident optical axis, as a unit, it affects the formed image in no way and thus, the driving of the scanning system M is made easy.

I claim:

1. An optical system for scanning a surface to be scanned in a slit-like form, comprising:
   means for forming an image of the surface to be scanned; and
   means for scanning the surface to be scanned, said means being disposed between said image forming means and a position whereat the image of the surface to be scanned is formed, said scanning means varying the direction of the optical axis of said system three or more odd number times to thereby make the direction of the optical axis incident on said scanning means and the direction of the optical axis emergent from said scanning means the same.

2. An optical system according to claim 1, wherein a surface of projection movable in synchronism with said scanning means is disposed at said position whereat the image of the surface to be scanned is formed, and the speed of movement of said scanning means is $\frac{1}{2}$ of the speed of movement of said surface of projection.

3. An optical system for scanning a surface to be scanned in a slit-like form, comprising:
   means for holding the surface to be scanned in a fixed state:
   means for forming the image of the surface to be scanned at a predetermined positon, said image forming means always maintaining a predetermined position relative to the surface to be scanned;
   means for limiting the image of the surface to be scanned so as to assume a slit-like form; and means for scanning the surface to be scanned, said means being disposed between said image forming means and a position whereat the image of the surface to be scanned is formed, said scanning means varying the direction of travel of a light beam three or more odd number times and further making the optical axis incident on said scanning means and the optical axis emergent from said scanning means parallel to each other and making said incidence optical axis and said emergence optical axis lie on the opposite sides of said scanning means.

4. A slit scanning copying apparatus for slit-scanning a fixed original surface and successively projecting the images thereof onto a photosensitive medium, said apparatus comprising:

a stationary imaging optical system for imaging the original surface on the photosensitive medium; and a scanning system disposed on said imaging optical system and said photosensitive medium, said scanning system varying the direction of the optical axis incident on said scanning system three or more odd number times and matching the direction of the optical axis emergent from said scanning system with the direction of the optical axis incident on said scanning system, said scanning system being movable at $\frac{1}{2}$ of the speed of movement of said photosensitive medium.

5. A copying apparatus according to claim 4, wherein said scanning system comprises a plurality of mirrors.

6. A copying apparatus according to claim 4, wherein said scanning system comprises a prism.

* * * * *